May 6, 1930.                H. H. BARBER ET AL                1,757,608
                              FLIGHT CONVEYER
                            Filed Dec. 14, 1927
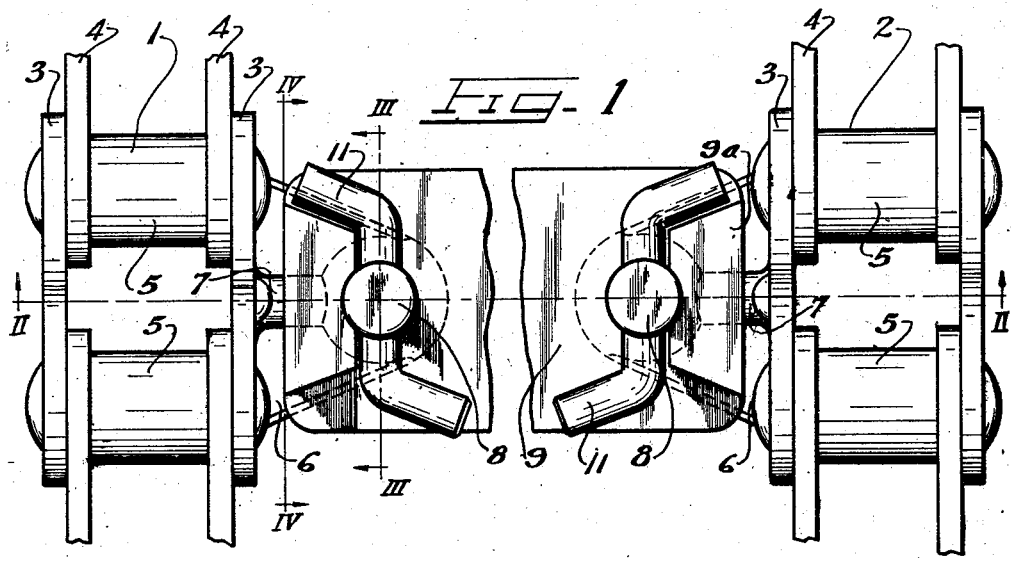
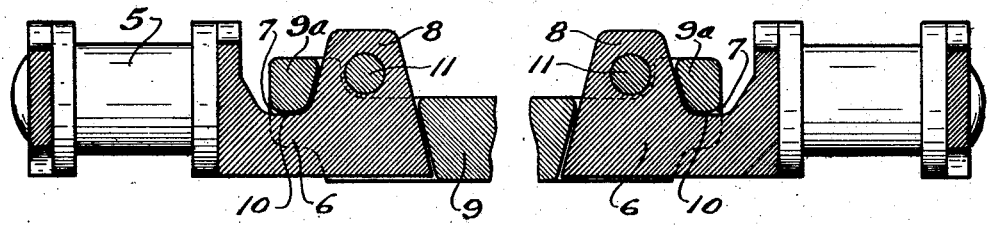
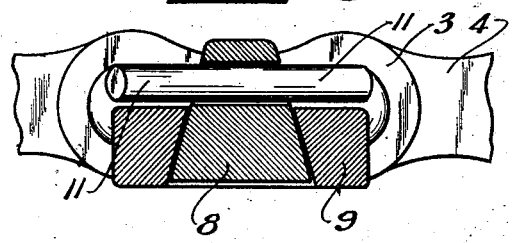 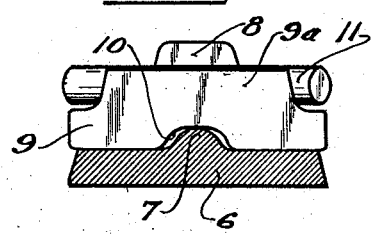
Inventor
Harry H. Barber
Paul A. Smith
by
Charles... Attys Patented May 6, 1930

1,757,608

UNITED STATES PATENT OFFICE

HARRY H. BARBER AND PAUL A. SMITH, OF AURORA, ILLINOIS, ASSIGNORS TO BARBER-GREENE COMPANY, OF AURORA, ILLINOIS, A CORPORATION OF ILLINOIS

FLIGHT CONVEYER

Application filed December 14, 1927. Serial No. 239,834.

This invention relates to a conveyer and concerns itself with a flight between the chains which can be readily applied or removed, which allows relative movement of the chains, which is comparatively low, and at the same time forms a strong and durable structure.

The invention comprises the novel structure and combination of parts hereinafter described and more particularly pointed out and defined in the appended claims.

In the accompanying drawings which illustrate a preferred embodiment of this invention and in which similar reference numerals refer to similar features in the different views:

Figure 1 is a fragmentary plan view of a pair of chains connected by our novel flight.

Figure 2 is an enlarged and broken sectional view taken upon the line II—II of Figure 1.

Figure 3 is an enlarged sectional view taken upon the line III—III of Figure 1.

Figure 4 is an enlarged sectional view taken upon the line IV—IV of Figure 1.

As shown on the drawings:

In the drawings, there is shown a fragmentary portion of a conveyer consisting of the marginal chains 1 and 2. Each chain is shown in the form of links 3 and 4 connected by studs 5. Predetermined links 3 in each chain have laterally projecting lugs 6. Each lug is provided with a vertical rib 7 and an upwardly extending vertical and tapered pivot stud 8 of conical formation.

A connector or connecting member 9 in the form of a narrow strip commonly called a flight that is adapted to convey material is provided with grooves 10 to fit the ribs 7, and is also provided with tapered apertures to fit the tapered studs 8 for connecting the marginal chains. This flight can be readily applied to the stud or quickly removed thru the proper manipulation of the angular retaining pins 11 which extend thru the pivot studs above the flight and normally maintain the connector on the studs. It will be observed that these retaining pins have angular terminals to prevent the same from falling out while in use.

It will be noted that the studs 8 and flight are relatively low and do not extend above the chain, making it possible for the flights to pass thru a narrow passage. It should also be noted that the connection between the chain is not rigid since the flight 9 is susceptible of swivelling slightly upon the pivot studs 8. With reference to Figures 2 and 4 it will be observed that the ends 9ª of the flight are higher than the other parts and the bottoms thereof rest upon the lugs 6 and the groove 10 take loosely over the rib 7 so that a limited amount of swivelling action between the connector and chains is provided in case there should be a slight difference in the ratio of travel of the chains.

We are aware that many changes may be made, and numerous details of construction may be varied through a wide range without departing from the principles of this invention, and we therefore do not purpose limiting the patent granted hereon, otherwise than necessitated by the prior art.

We claim as our invention:

1. In a conveyer comprising spaced chains, a lug projecting laterally from each chain, each lug having a vertical rib and a tapered pivot, a connector having apertures for engaging said pivots, and elevated ends with grooves for receiving said ribs, and angular pins extending thru said pivot studs above said connector for retaining the latter on said studs for swivelling action.

2. In a flight conveyer, a pair of spaced chains, each chain having inwardly directed lugs with integral vertical and tapered pivot studs, flights having tapered apertures pivoted upon said studs and connecting said chains and transverse pins extending through said studs for loosely retaining said flight upon said studs.

3. In a flight conveyer, a pair of spaced chains, each having an inwardly directed lug with an integral conical stud and a flight having conical apertures loosely fitting said stud, said flight and lugs having interfitting parts and being substantially flush at the bottom.

In testimony whereof, we have hereunto subscribed our names.

HARRY H. BARBER.
PAUL A. SMITH.